(12) United States Patent
Zadpour

(10) Patent No.: US 10,865,726 B2
(45) Date of Patent: Dec. 15, 2020

(54) FAULT DIAGNOSIS OF ELECTRONIC CONTROL UNIT (ECU)

(71) Applicant: Ehsanollah Zadpour, Tehran (IR)

(72) Inventor: Ehsanollah Zadpour, Tehran (IR)

(*) Notice: Subject to any disclaimer, the term of this patent is extended or adjusted under 35 U.S.C. 154(b) by 0 days.

(21) Appl. No.: 16/266,067

(22) Filed: Feb. 3, 2019

(65) Prior Publication Data
US 2019/0242325 A1    Aug. 8, 2019

Related U.S. Application Data

(60) Provisional application No. 62/626,081, filed on Feb. 4, 2018.

(51) Int. Cl.
*F02D 41/22*    (2006.01)
*F02D 41/26*    (2006.01)
(Continued)

(52) U.S. Cl.
CPC ........... *F02D 41/221* (2013.01); *F02D 41/22* (2013.01); *F02D 41/26* (2013.01);
(Continued)

(58) Field of Classification Search
CPC ........ F02D 41/22; F02D 41/221; F02D 41/26; F02D 41/3082; F02D 41/042;
(Continued)

(56) References Cited

U.S. PATENT DOCUMENTS 9,677,529 B2 * 6/2017 Ohsaki ..................... G07C 5/00

FOREIGN PATENT DOCUMENTS

CN    202067143 U    12/2011
CN    102566561 A    7/2012
(Continued)

OTHER PUBLICATIONS

Yang Li et al., Fault Diagnosis of Automobile ECUs with data mining Technologies, Applied Mechanics and Materials, 2010, pp. 156-161, vols. 40-41.
(Continued)

*Primary Examiner* — Hieu T Vo
(74) *Attorney, Agent, or Firm* — Bajwa IP Law Firm; Haris Zaheer Bajwa

(57) ABSTRACT

A method for fault diagnosis in an electronic control unit (ECU) of an engine fuel injection system. The method includes keeping the ECU and the engine fuel injection system at a set of pre-defined conditions, measuring an electrical current consumption of the ECU, and detecting a status of the ECU based on the measured electrical current consumption. Keeping the ECU and the engine fuel injection system at the set of pre-defined conditions includes switching the ECU on by switching the engine fuel injection system on, and keeping the engine fuel injection system at a not-running state. Detecting the status of the ECU based on the measured electrical current consumption includes detecting a normal status responsive to the measured electrical current consumption being in a normal electrical current range, detecting a first hardware defect in the ECU responsive to the measured electrical current consumption being in a first electrical current range, and detecting a second hardware defect in the ECU responsive to the measured electrical current consumption being in a second electrical current range.

18 Claims, 4 Drawing Sheets

(51) Int. Cl.
  *F02D 41/30*  (2006.01)
  *G06F 11/07*  (2006.01)
  *F02D 41/20*  (2006.01)
  *F02D 41/04*  (2006.01)

(52) U.S. Cl.
  CPC ...... *F02D 41/3082* (2013.01); *G06F 11/0703* (2013.01); *F02D 41/042* (2013.01); *F02D 41/266* (2013.01); *F02D 2041/2058* (2013.01); *F02D 2041/224* (2013.01)

(58) Field of Classification Search
  CPC ........... F02D 41/266; F02D 2041/2058; F02D 2041/224; G06F 11/0703
  See application file for complete search history.

(56) References Cited

FOREIGN PATENT DOCUMENTS

| | | |
|---|---|---|
| CN | 106200609 A | 12/2016 |
| DE | 102015207895 A1 | 11/2016 |
| JP | 2016071635 A | 5/2016 |

OTHER PUBLICATIONS

Geetishree Mishra et al., Deploying Health Monitoring ECU Towards Enhancing the Performance of In-Vehicle Network, Published 2012 in ArXiv.

Christian Gleichner and Heinrich T. Vierhaus, Test of Automotive Embedded Processors with High Diagnostic Resolution, 2016 IEEE 19th International Symposium on Design and Diagnostics of Electronic Circuits & Systems (DDECS).

Christian Gleichner and Heinrich T. Vierhaus, Test and Diagnosis of Automotive Embedded Processors via High-Speed Standard Interfaces, Journal of Circuits, Systems, and Computers, 2017, pp. 1740006-1 to 1740006-17, vol. 26, No. 8.

Yash Vardhan Pant et al., Autoplug: An Architecture for Remote Electronic Controller Unit Diagnostics in Automotive Systems, Scholarly Commons: http://repository.upenn.edu/mlab_papers/49, Jan. 2012.

Sung Young Kim, Fault Diagnosis of a ZVS DC-DC Converter Based on DC-Link Current Pulse Shapes, IEEE Transactions on Industrial Electronics, Mar. 2008, pp. 1491-1494, vol. 55, No. 3.

* cited by examiner

FAULT DIAGNOSIS OF ELECTRONIC CONTROL UNIT (ECU)

CROSS-REFERENCE TO RELATED APPLICATION

This application claims the benefit of priority from U.S. Provisional Patent Application Ser. No. 62/626,081, filed on Feb. 4, 2018, and entitled "CHECK STATUS SYSTEM OF CAR ENGINE CONTROL UNIT," which is incorporated herein by reference in its entirety.

TECHNICAL FIELD

The present disclosure generally relates to fault diagnosis of electronic control units (ECUs), and particularly, to a method and system for in-situ fault diagnosis of ECUs based on the ECU electrical current consumption.

BACKGROUND

Electronic systems are extensively deployed in new cars, and major electronic parts are used in vehicles, such as the electronic control unit (ECU) of the fuel injection system. However, there is no system embedded in the cars to show the status of the ECU of the engine fuel injection system in various modes (e.g., functionally well, having hardware defects, or declaring the defective zone to the repairer if there is a hardware defect).

Engineers and motor designers have tried to design diagnostic systems for the fuel injection system in vehicles that led to the design of the check engine light. Although the check engine light of the fuel injection system significantly helps the driver/user to be informed about the general defects in a fuel injection system, it is not able to display an exact message in the case of ECU defect. Since the check light alarm is turned on for the entire fuel injection system, it is not able to specify the precise state of the ECU, type of defect, and the defective zone and integrated circuit (IC) of the ECU. This has led to complicated troubleshooting processes for the repairer. Even in case of troubleshooting with diagnostic tools, the diagnostic tool declares the fault but it is not able to assure the repairer whether the problem is related to the ECU hardware or the fuel injection parts.

Due to the inability to diagnose the ECU hardware defects, designers invented an ECU-tester device, which could show the problems of the ECU and defective ICs accurately to a repairer. However, this device has its own problems, including being not portable, the inaccessibility of a driver to the data, as well as the high cost that a repairer has to pay for every unit separately to provide a socket, and also the inability of the device to display the precise status of ECU. Additionally, some approaches have been explored for detecting ECU defects utilizing a diagnosis based on solely relevant software defects. Other approaches have been also developed, in which the whole ECU manufacturing process may be revised and so some hardware or software changes in ECU's structure may be required, or some of these approaches could diagnose the defects of the ECU outside the vehicle engine that require removing the ECU from the related engine.

There is, therefore, a need for a system and method for fault diagnosis of an ECU that could be installed and implemented on any type of engine vehicle without changing hardware or software of an ECU. Additionally, there is a need to design and develop a cost-effective system and method of utilizing thereof, which inform a driver about the extent of a failure of an ECU to help the driver to make an appropriate decision. There is also a need for a system and method to accurately diagnose an ECU's defects or health, and the failure point (in case of failure) to the repairer without a requirement to remove the ECU from the respective engine system installed thereon.

SUMMARY

This summary is intended to provide an overview of the subject matter of the present disclosure, and is not intended to identify essential elements or key elements of the subject matter, nor is it intended to be used to determine the scope of the claimed implementations. The proper scope of the present disclosure may be ascertained from the claims set forth below in view of the detailed description below and the drawings.

In one general aspect, the present disclosure describes an exemplary method for fault diagnosis in an electronic control unit (ECU) of an engine fuel injection system. The exemplary method may include keeping the ECU and the engine fuel injection system at a set of pre-defined conditions, measuring an electrical current consumption of the ECU, and detecting a status of the ECU based on the measured electrical current consumption.

In an exemplary implementation, keeping the ECU and the engine fuel injection system at the set of pre-defined conditions may include switching the ECU on by switching the engine fuel injection system on, and keeping the engine fuel injection system at a not-running state. In an exemplary implementation, detecting the status of the ECU based on the measured electrical current consumption may include detecting a normal status responsive to the measured electrical current consumption being in a normal electrical current range, detecting a first hardware defect in the ECU responsive to the measured electrical current consumption being in a first electrical current range, and detecting a second hardware defect in the ECU responsive to the measured electrical current consumption being in a second electrical current range.

In an exemplary implementation, keeping the engine fuel injection system at the not-running state may include keeping an output voltage of a crank shaft sensor pin less than a threshold voltage, and keeping an output voltage of the ECU less than the threshold voltage. In an exemplary embodiment, keeping the output voltage of the ECU less than the threshold voltage may include keeping the output voltage of the ECU at an actuator pin of at least one of a stepper motor, a throttle motor, and combinations thereof less than the threshold voltage.

In an exemplary implementation, detecting the normal status may include detecting the normal status responsive to the measured electrical current consumption being in a range between 70 mA and 260 mA. In an exemplary embodiment, detecting the first hardware defect in the ECU may include detecting the first hardware defect in the ECU responsive to the measured electrical current consumption being in a range between 350 mA and 1.2 A. In an exemplary embodiment, detecting the first hardware defect in the ECU may include detecting at least one of a short circuit in a 5V-IC, a damaged 5V-IC, a burnt 5V-IC, a failure in a 5V component on the ECU board, and combinations thereof. In an exemplary embodiment, detecting the first hardware defect in the ECU may include detecting a short circuit in at least one of an injector IC, a fan IC, a knock IC, a coil IC, a microcontroller IC, a regulator IC, an air pressure sensor, a temperature sensor, a water sensor, a part of injection system of the ECU, a 5V-part of control unit circuit, and combinations thereof. In an exemplary embodiment, detecting the first hardware defect in the ECU may include detecting at least one of a burnt injector IC, a burnt fan IC, a burnt knock IC, a burnt coil IC, a burnt microcontroller IC, a burnt regulator IC, a burnt pressure sensor, a burnt temperature sensor, a burnt water sensor, and combinations thereof.

In an exemplary implementation, detecting the second hardware defect in the ECU may include detecting the second hardware defect in the ECU responsive to the measured electrical current consumption being in a range between 1.2 A and 3 A. In an exemplary embodiment, detecting the second hardware defect in the ECU may include detecting at least one of a short circuit in a 12V-IC, a short circuit in a 12V part of the ECU, a damaged 12V-IC, a burnt 12V-IC, a failure in a 12V component on the ECU board, and combinations thereof. In an exemplary embodiment, detecting the second hardware defect in the ECU may include detecting a failure in at least one of a regulator IC, a connection to a diagnostic IC, a stepper motor controller IC, and combinations thereof.

In an exemplary implementation, measuring the electrical current consumption of the ECU may include measuring an electrical current at a positive power supply pin of the ECU. In an exemplary implementation, measuring the electrical current consumption of the ECU may include connecting an electrical current sensor to the positive power supply pin of the ECU, and measuring a value of the electrical current at the positive power supply pin of the ECU using the electrical current sensor.

In an exemplary implementation, the method may further include sending a warning signal associated with the detected status of the ECU responsive to the engine fuel injection system being at the not-running state. In an exemplary embodiment, sending the warning signal associated with the detected status of the ECU may include measuring an output voltage of the ECU using an actuator of the engine fuel injection system, measuring an output voltage of a crank shaft sensor of the engine fuel injection system, comparing the measured output voltage of the ECU and the measured output voltage of the crank shaft sensor with a threshold voltage, and switching on an alarm light associated with the detected status of the ECU responsive to the measured output voltage of the ECU and the measured output voltage of the crank shaft sensor being less than the threshold voltage. In an exemplary embodiment, measuring the output voltage of the ECU may include measuring a DC voltage at an actuator pin of at least one of a stepper motor, a throttle motor, and combinations thereof. In an exemplary embodiment, measuring the output voltage of the crank shaft sensor may include measuring an AC voltage at output of the crank shaft sensor.

In an exemplary implementation, a system for fault diagnosis of an electronic control unit (ECU) is disclosed. The system may include an electrical current sensor connected to the ECU of an engine fuel injection system, and a processing unit connected to the electrical current sensor, a crank shaft sensor, and at least one actuator of the engine fuel injection system.

In an exemplary embodiment, the electrical current sensor may be configured to measure an electrical current consumption of the ECU. In an exemplary embodiment, the processing unit may be configured to receive an output voltage of the crank shaft sensor, receive an output voltage of the ECU from the at least one actuator of the engine fuel injection system, receive the electrical current consumption of the ECU from the electrical current sensor, and analyze the output voltage of the crank shaft sensor, the output voltage of the ECU, and the electrical current consumption of the ECU. In an exemplary embodiment, the processing unit may be configured to analyze the output voltage and the electrical current by comparing the output voltage of the crank shaft sensor and the output voltage of the ECU with a threshold voltage, and detecting a status of the ECU based on the electrical current consumption of the ECU.

In an exemplary embodiment, the processing unit may be further configured to send a warning signal associated with the detected status of the ECU by switching on an alarm light associated with the detected status of the ECU. In an exemplary embodiment, the processing unit may include a microcontroller.

Other exemplary systems, methods, features and advantages of the implementations will be, or will become, apparent to one of ordinary skill in the art upon examination of the following figures and detailed description. It is intended that all such additional systems, methods, features and advantages be included within this description and this summary, be within the scope of the implementations, and be protected by the claims herein.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The following detailed description is presented to enable a person skilled in the art to make and use the methods and devices disclosed in exemplary embodiments of the present disclosure. For purposes of explanation, specific nomenclature is set forth to provide a thorough understanding of the present disclosure. However, it will be apparent to one skilled in the art that these specific details are not required to practice the disclosed exemplary embodiments. Descriptions of specific exemplary embodiments are provided only as representative examples. Various modifications to the exemplary implementations will be readily apparent to one skilled in the art, and the general principles defined herein may be applied to other implementations and applications without departing from the scope of the present disclosure. The present disclosure is not intended to be limited to the implementations shown, but is to be accorded the widest possible scope consistent with the principles and features disclosed herein.

Herein an exemplary method and system is disclosed for fault diagnosis in an electronic control unit (ECU). In an exemplary embodiment, the exemplary method and system may be utilized for detecting hardware defects in an exemplary ECU of all types of engines, such as four stroke engines, fuel engines, petrol engines, and diesel engines. In an exemplary embodiment, the exemplary method and system may be utilized for detecting hardware defects in an exemplary ECU of an engine fuel injection system of a vehicle, for example, an automotive engine fuel injection system, such as a petrol engine system.

In an exemplary implementation, the exemplary method and system may be utilized for in-situ diagnosis of faults and errors in an exemplary ECU with no need to remove the ECU from the respective engine. Additionally, the exemplary method and system may be utilized for fault diagnosis in the exemplary ECU that may include detecting hardware defects in the exemplary ECU based on only the electrical current consumption by the ECU. The electrical current consumption by the ECU may be measured by an electrical current sensor that may be embedded in the ECU's circuit before the ECU power supply pin. The measured electrical current value may be used as a criterion for determining the type of fault in the ECU or determining a health status (correct functioning) for the ECU.

Figure 1A:
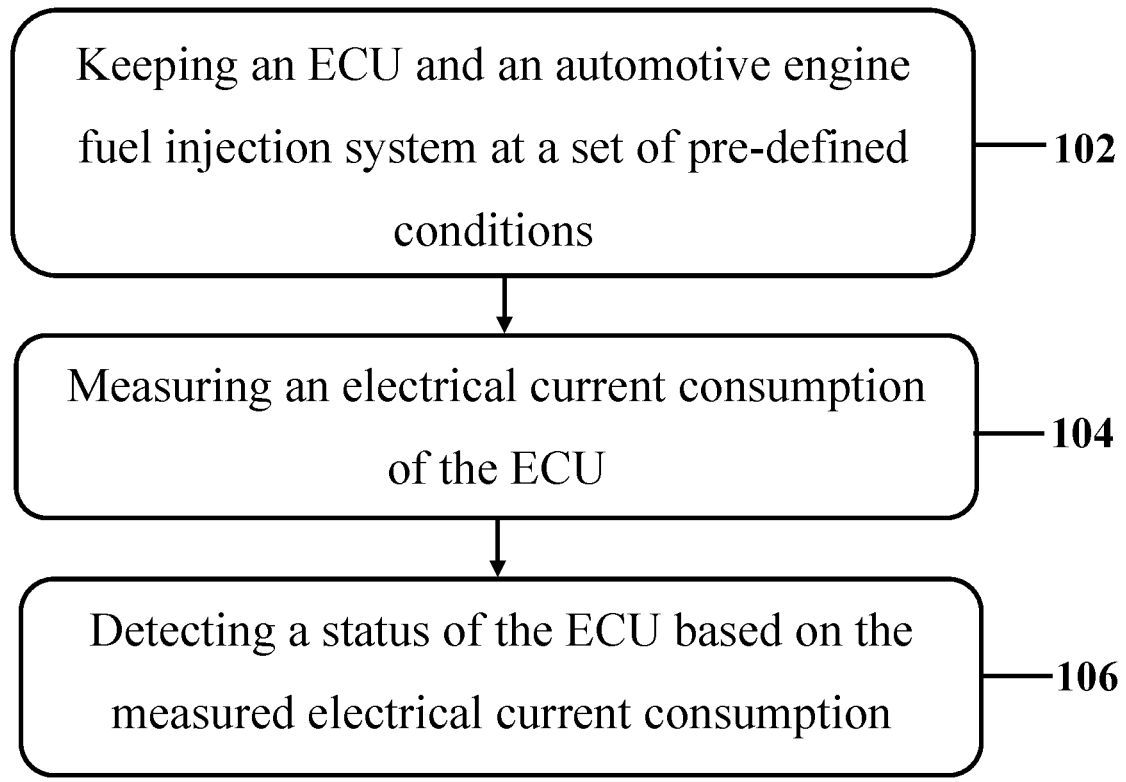
FIG. 1A shows an exemplary implementation of an exemplary method for fault diagnosis in an exemplary electronic control unit (ECU) of an exemplary engine fuel injection system, consistent with one or more exemplary embodiments of the present disclosure.

FIG. 1A shows an exemplary implementation of an exemplary method for fault diagnosis in an exemplary ECU of an exemplary engine fuel injection system, consistent with one or more exemplary embodiments of the present disclosure. An exemplary method 100 may include keeping an ECU and an engine fuel injection system at a set of pre-defined conditions (step 102), measuring an electrical current consumption of the ECU (step 104), and detecting a status of the ECU based on the measured electrical current consumption (step 106).

In further detail with respect to step 102, keeping an ECU and an engine fuel injection system at a set of pre-defined conditions may include switching the ECU on by switching the engine fuel injection system on, and keeping the engine fuel injection system at a not-running state. In an exemplary embodiment, the "not-running state" may refer to a state for the engine fuel injection system in which the engine fuel injection system may be electrically ON, but it is not moving or does not crank. In addition, at the not-running state, the ECU and the engine fuel injection system may be electrically ON, but the engine fuel injection system is not moving and no part of the engine fuel injection system may be electrically supplied by the ECU.

In an exemplary implementation, keeping the ECU and the engine fuel injection system at the set of pre-defined conditions may include switching the engine fuel injection system on in a situation that the ECU of the engine fuel injection system may be switched on while the engine is not yet running. In this case, keeping the ECU and the engine fuel injection system at the set of pre-defined conditions may include switching the engine fuel injection system on in a manner in which the ECU may be switched on by connecting to an input current while actuators of the engine fuel injection system, such as stepper motor and/or throttle motor may not be electrically supplied by the ECU. Therefore, the output voltage of the ECU may be maintained at a value less than the threshold voltage; and as a result, the output current of the ECU may be maintained at a value less than a threshold current because of supplying no part of the engine fuel injection system by the ECU. In an exemplary embodiment, keeping the ECU and the engine fuel injection system at the set of pre-defined conditions may include switching the ECU on while keeping an ignition system and a starter of the engine fuel injection system switched off.

In an exemplary embodiment, switching the ECU on by switching the engine fuel injection system on may include switching the ECU on by turning the respective car switch to ON mode. In an exemplary embodiment, switching the ECU on by switching the engine fuel injection system on may include turning an ignition switch of the respective car to ON mode. In an exemplary embodiment, keeping the engine fuel injection system at the not-running state may include keeping the engine fuel injection system not-started.

In an exemplary embodiment, keeping the engine fuel injection system at the not-running state may include keeping an output voltage of a crank shaft sensor pin less than a threshold voltage, and keeping an output voltage of the ECU less than the threshold voltage. In an exemplary embodiment, keeping the output voltage of the ECU less than the threshold voltage may include keeping the output voltage of the ECU at an actuator pin of at least one of a stepper motor, a throttle motor, and combinations thereof less than the threshold voltage.

In an exemplary embodiment, keeping the output voltage of the crank shaft sensor pin less than the threshold voltage may be obtained by keeping the engine fuel injection system not-moving. In an exemplary embodiment, keeping the output voltage of the ECU at the actuator pin of at least one of the stepper motor, the throttle motor, and combinations thereof less than the threshold voltage may include that the ECU may not electrically supply actuators of the engine fuel injection system.

In an exemplary embodiment, keeping the output voltage of the crank shaft sensor pin less than the threshold voltage may include keeping the output voltage of the crank shaft sensor pin near zero. In an exemplary embodiment, keeping the output voltage of the crank shaft sensor pin less than the threshold voltage may include keeping the output voltage of the crank shaft sensor pin at a value less than about 1 V for a petrol engine system.

In an exemplary embodiment, keeping the output voltage of the ECU at the actuator pin of at least one of the stepper motor, the throttle motor, and combinations thereof less than the threshold voltage may include keeping the output voltage of the ECU at the actuator pin of at least one of the stepper motor, the throttle motor, and combinations thereof near zero. In an exemplary embodiment, keeping the output voltage of the ECU at the actuator pin of at least one of the stepper motor, the throttle motor, and combinations thereof less than the threshold voltage may include keeping the output voltage of the ECU at the actuator pin of at least one of the stepper motor, the throttle motor, and combinations thereof at a value less than about 4 V, for example, keeping the output voltage of the ECU at the actuator pin of at least one of the stepper motor, the throttle motor, and combinations thereof at a value less than about 1 V for an ECU of a petrol engine system.

In an exemplary embodiment, the threshold voltage may depend on type of the ECU, so that the threshold voltage may be customized for each type of ECU. In an exemplary embodiment, the threshold voltage may be determined based on the ECU's datasheet that may be prepared by the ECU's producer. In an exemplary embodiment, the threshold voltage may be equal to a minimum voltage that may be required for electrically supplying at least one of a sensor, an actuator, a part of the engine fuel injection system, and combinations thereof by the ECU. The minimum voltage may be available in the ECU's datasheet. In an exemplary embodiment, keeping the output voltage of the ECU at the actuator pin of at least one of the stepper motor, the throttle motor, and combinations thereof less than the threshold voltage may be obtained by changing the software of ECU to provide a time period for the ECU without supplying actuators of the engine fuel injection system in order to measure the exact ECU's current consumption and display the exact status of ECU.

In further detail with respect to step 104, measuring an electrical current consumption of the ECU may include measuring an electrical current at a positive power supply pin of the ECU using an electrical current sensor. In an exemplary implementation, measuring the electrical current consumption of the ECU may include connecting an electrical current sensor to the positive power supply pin of the ECU, and measuring a value of the electrical current at the positive power supply pin of the ECU using the electrical current sensor. The electrical current sensor may be embedded in the ECU circuit of the engine fuel injection system connected to the positive power supply pin of the ECU.

In an exemplary embodiment, the ECU may have two or more positive power supply pin. In such cases, measuring the electrical current consumption of the ECU may include connecting a set of electrical current sensors to the two or more positive power supply pins of the ECU in series, measuring the value of the electrical current at each positive power supply pin of the ECU using the electrical current sensor, and calculating sum of the measured values of the electrical current as the electrical current consumption of the ECU.

In further detail with respect to step 106, detecting a status of the ECU based on the measured electrical current consumption may include detecting a normal status or a defective status for the ECU based on the measured electrical current. In an exemplary embodiment, a normal status for the ECU may be an indicator of that the ECU works properly. In an exemplary embodiment, a defective status for the ECU may be an indicator of one or more hardware defects in the ECU.

In an exemplary implementation, detecting the status of the ECU based on the measured electrical current consumption may include at least one of detecting a normal status responsive to the measured electrical current consumption being in a normal electrical current range, detecting a first hardware defect in the ECU responsive to the measured electrical current consumption being in a first electrical current range, and detecting a second hardware defect in the ECU responsive to the measured electrical current consumption being in a second electrical current range. Each electrical current range associated with each status of the ECU may be calibrated and customized for each type of ECU circuits.

In an exemplary implementation, detecting the normal status may include detecting the normal status if the measured electrical current consumption is in a range between about 70 mA and about 260 mA. Detecting the normal status may indicate that there is no defect in the ECU hardware. In this case, the electrical current consumption by the ECU (while the ECU is switched on but the respective engine is not running yet, and the ECU does not supply actuators of the respective engine system) may be in a range between about 70 mA and about 260 mA as an exemplary normal electrical current range.

In an exemplary implementation, detecting the first hardware defect in the ECU may include detecting the first hardware defect in the ECU if the measured electrical current consumption is in a range between about 350 mA and about 1.2 A as an exemplary first electrical current range. Detecting the first hardware defect in the ECU may include detecting a hardware defect in a 5V element of the ECU. In this case, the electrical current consumption by the ECU while the ECU is switched on but the respective engine is not running yet and the ECU does not supply actuators of the respective engine system, may be in a range between about 350 mA and about 1.2 A.

In an exemplary embodiment, detecting the first hardware defect in the ECU may include detecting at least one of a short circuit in a 5V-IC of the ECU, a damaged 5V-IC of the ECU, a burnt 5V-IC of the ECU, a failure in a 5V component on the ECU board, and combinations thereof. In an exemplary embodiment, detecting the first hardware defect in the ECU may include detecting a short circuit in at least one of an injector IC, a fan IC, a knock IC, a coil IC, a microcontroller IC, a regulator IC, an air pressure sensor, a temperature sensor, a water sensor, a part of injection system of the ECU, a 5V-part of control unit circuit, and combinations thereof. In an exemplary embodiment, detecting the first hardware defect in the ECU may include detecting at least one of a burnt injector IC, a burnt fan IC, a burnt knock IC, a burnt coil IC, a burnt microcontroller IC, a burnt regulator IC, a burnt pressure sensor, a burnt temperature sensor, a burnt water sensor, and combinations thereof.

In an exemplary implementation, detecting the second hardware defect in the ECU may include detecting the second hardware defect in the ECU if the measured electrical current consumption is in a range between about 1.2 A and about 3 A as an exemplary second electrical current range. Detecting the second hardware defect in the ECU may include detecting a serious hardware defect in a 12V element of the ECU. In this case, the electrical current consumption by the ECU while the ECU is switched on but the respective engine is not running yet and the ECU does not supply actuators of the respective engine system, may be in a range between about 1.2 A and about 3 A.

In an exemplary embodiment, detecting the second hardware defect in the ECU may include detecting at least one of a short circuit in a 12V-IC, a short circuit in a 12V part of the ECU, a damaged 12V-IC, a burnt 12V-IC, a failure in a 12V component on the ECU board, and combinations thereof. In an exemplary embodiment, detecting the second hardware defect in the ECU may include detecting a failure in at least one of a regulator IC, a connection to a diagnostic IC, a stepper motor controller IC, and combinations thereof.

Furthermore, the exemplary method and the exemplary system of the present disclosure may be customized and adapted for all types of ECUs of all automotive types or engine types. In an exemplary implementation, the exemplary method and system may be customized for fault diagnosis in an exemplary ECU of an exemplary diesel engine. For example, the exemplary ranges of the measured electrical current consumption may be customized respective to each category of hardware defects. Moreover, more categories of hardware defects and their respective ranges of the measured electrical current consumption may be utilized for other types of ECU.

In an exemplary implementation, for fault diagnosis in an exemplary ECU of an exemplary diesel engine, the exemplary ranges of the measured electrical current consumption may be re-calibrated regarding the properties of exemplary ECU circuit and exemplary engine system of the exemplary diesel engine. For example, a third hardware defect associated with an exemplary 24V-component of the exemplary ECU may be detected using the exemplary method and system disclosed hereinabove for the exemplary diesel engine. In this case, step 106 of exemplary method 100 may further include detecting a third hardware defect in the ECU responsive to the measured electrical current consumption being in a third electrical current range. In an exemplary embodiment, detecting the third hardware defect in the ECU may include detecting the third hardware defect in the ECU if the measured electrical current consumption is more than the second electrical current range. In an exemplary embodiment, detecting the third hardware defect in the ECU may include detecting the third hardware defect in the ECU if the measured electrical current consumption is more than about 3 A. In an exemplary embodiment, detecting the third hardware defect in the ECU may include detecting at least one of a short circuit error in a 24V-IC, a damaged 24V-IC, a burnt 24V-IC, a failure in a 24V component on the ECU board, and combinations thereof.

Figure 1B:
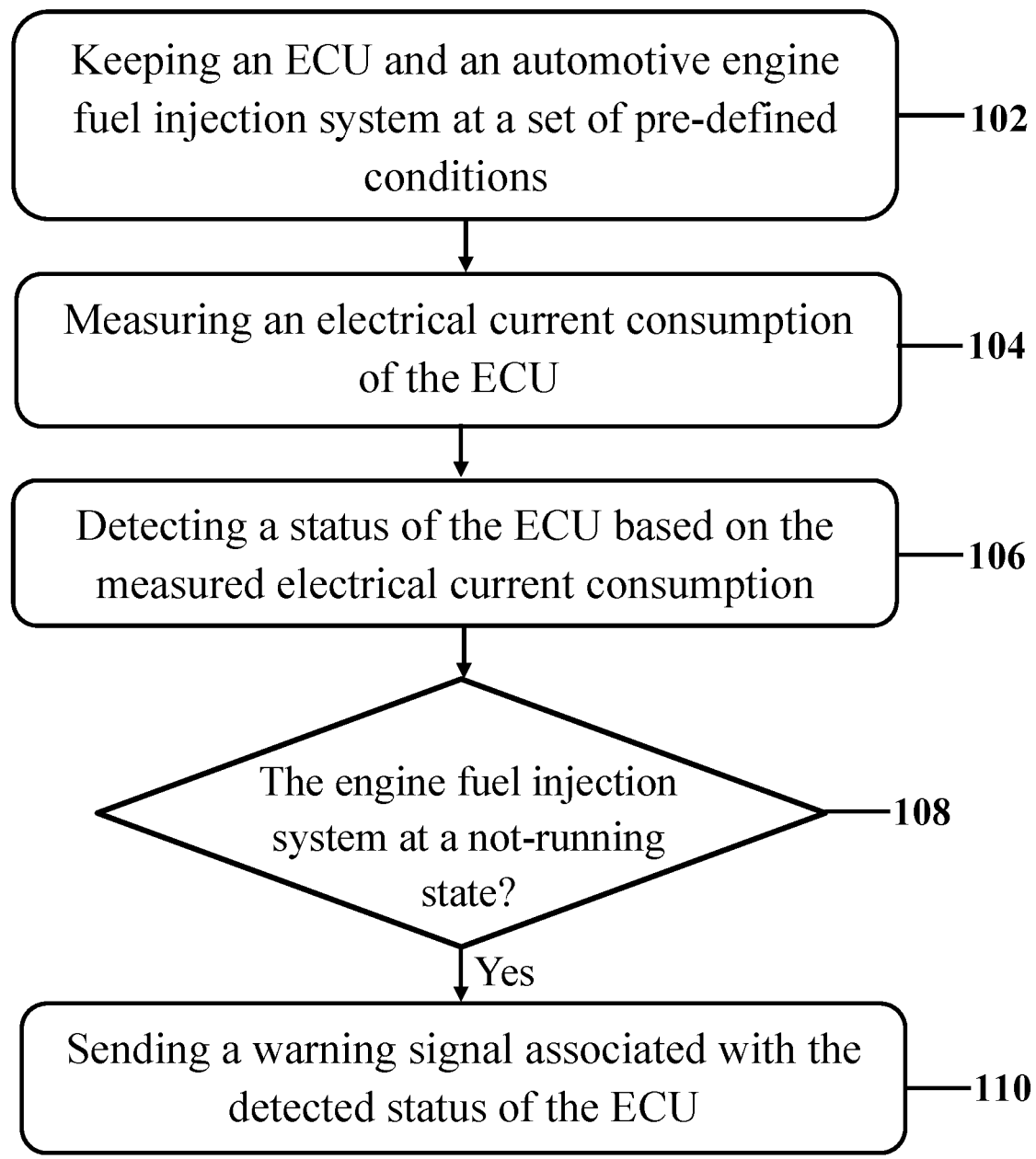
FIG. 1B shows another exemplary implementation of the exemplary method for fault diagnosis in an exemplary electronic control unit (ECU) of an exemplary engine fuel injection system, consistent with one or more exemplary embodiments of the present disclosure.

Furthermore, FIG. 1B shows another exemplary implementation of the exemplary method for fault diagnosis in an exemplary electronic control unit (ECU) of an exemplary engine fuel injection system, consistent with one or more exemplary embodiments of the present disclosure. In an exemplary implementation, method 150 may further include sending a warning signal associated with the detected status of the ECU (step 110) responsive to the engine fuel injection system being at the not-running state (step 108, yes), in addition to steps of method 100.

In an exemplary embodiment, checking the engine fuel injection system being at the not-running state (step 108) may include checking the output voltage of the ECU at the actuator pin(s) of the stepper motor and/or the throttle motor, and also the output voltage of the crank shaft sensor pin being less than the threshold voltage. In an exemplary embodiment, comparing the output voltage of the ECU at the actuator pin(s) of the stepper motor and/or the throttle motor, and also the output voltage of the crank shaft sensor pin with the threshold voltage (step 108) may result in sending or displaying a warning signal associated with the detected status of the ECU (step 110) if the output voltage of the ECU and the output voltage of the crank shaft sensor pin are less than the threshold voltage. In another exemplary embodiment, comparing the output voltage of the ECU and the output voltage of the crank shaft sensor pin with the threshold voltage may result in that sending or displaying the warning signal associated with the detected status of the ECU (step 110) may be stopped if the output voltage of the ECU and the output voltage of the crank shaft sensor pin are equal or more than the threshold voltage. In an exemplary embodiment, checking the output voltage of the ECU and the output voltage of the crank shaft sensor pin to be less than the threshold voltage (step 108) may be carried out in order to confirm the accuracy and correctness of exemplary results that may be obtained by detecting the status of the ECU based on the measured electrical current consumption (step 106).

In further detail with respect to steps 108 and 110, sending or declaring the warning signal associated with the detected status of the ECU (step 110) responsive to the engine fuel injection system being at the not-running state (step 108, yes) may include switching on an alarm light associated with the detected status of the ECU in order to declare the driver or repairer the type of the detected status of the ECU if the engine fuel injection system is at the not-running state. In an exemplary embodiment, sending the warning signal associated with the detected status of the ECU may include switching a normal alarm light on responsive to detecting the normal status, switching a first alarm light on responsive to detecting the first hardware defect, and switching a second alarm light on responsive to detecting the second hardware defect.

In an exemplary embodiment, switching the normal alarm light on may include switching a green alarm light on that may show that no hardware defect may be detected in the ECU and the ECU may function well. So, the ECU hardware should not be manipulated. In another exemplary embodiment, switching the first alarm light on may include switching a yellow alarm light on that may show a hardware defect, such as a short circuit or a burnt 5V-IC in the ECU board. This warning may indicate that the detected hardware defect consequently will cause failure of the engine system by driving more distances. The ECU should be removed from car and opened; thereby, 5V-ICs should be checked. For example, the damaged electronic components should be replaced and/or the short circuit in ECU should be resolved. In a further exemplary embodiment, switching the second alarm light on may include switching a red alarm light on that may show a serious and severe hardware defect, such as a short circuit or a burnt 12V-IC in the ECU board. In this case, the driver should not drive anymore, otherwise there may be a high possibility that the ECU will be damaged. The ECU should be removed and the 12V-ICs and/or 12V components in the ECU board should be checked to diagnose the defected element.

In an exemplary embodiment, sending or declaring the warning signal associated with the detected status of the ECU (step 110) responsive to the engine fuel injection system being at the not-running state (step 108, yes) may include measuring the output voltage of the ECU using an actuator of the engine fuel injection system, measuring the output voltage of the crank shaft sensor of the engine fuel injection system, comparing the measured output voltage of the ECU and the measured output voltage of the crank shaft sensor with the threshold voltage, and switching on the alarm light associated with the detected status of the ECU if the measured output voltage of the ECU and also the measured output voltage of the crank shaft sensor are less than the threshold voltage.

In an exemplary embodiment, checking the engine fuel injection system being at the not-running state (step 108) may include getting two feedbacks from the engine fuel injection system, and comparing the two feedbacks with the threshold voltage value. In an exemplary embodiment, the two feedback may include a feedback voltage of an actuator of the engine fuel injection system that may be electrically supplied by the ECU while the engine is running, and a feedback voltage of the crank shaft sensor. In an exemplary embodiment, each of the two feedbacks may include at least one of a DC voltage or an AC voltage of a sensor or an actuator of the engine fuel injection system. In an exemplary embodiment, the two feedbacks may include at least one of a DC voltage at a pin of at least one of the stepper motor, the throttle motor, and combinations thereof. In an exemplary embodiment, measuring the output voltage of the ECU may include measuring a DC voltage at an actuator pin of at least one of the stepper motor, the throttle motor, and combina tions thereof. In an exemplary embodiment, measuring the output voltage of the crank shaft sensor may include measuring an AC voltage at output of the crank shaft sensor.

Table 1. A summary of exemplary measured electrical current consumption ranges of an exemplary ECU of a petrol engine and the corresponding detected results

| Current Consumption (mA) | Alarm Light | ECU status | Information for repairer | Information for driver |
|---|---|---|---|---|
| 70-260 | Green | Functionally well (Normal status) | There is no hardware problem in ECU (The repairer should not manipulate the ECU hardware). The repairer should check the other parts of the fuel injection system for defect detection (e.g., sensors and/or actuators by considering other fuel injection parameters), or reset the ECU to fix the defect without opening the ECU. | There is no hardware defect in the ECU |
| 350-1200 | Yellow | First hardware defect | one or two 5 V-ICs have a short circuit or are burnt (such as the Injector IC, knock IC, coil or Fan IC and etc.), or there is a short circuit in the 5 V-parts of control unit circuit, so the repairer should replace the damaged electronic components or resolve the short circuit in ECU. | A hardware defect consequently will cause failure of the engine system by driving more distances. |
| 1200-3000 | Red | Severe short circuit in the ECU hardware (Second hardware defect) | A severe short circuit in the ECU circuit (e.g. short-circuit conditions in 12 V parts of the ECU circuit, such as regulator IC, connection to the diagnostic IC, stepper motor IC, etc.). The repairer should replace the damaged electronic components or resolve the short circuit in the ECU. | The driver should not drive anymore otherwise there may be a high possibility that the ECU will be damaged. |

In an exemplary embodiment, checking the engine fuel injection system to be at the not-running state may include checking at least one of the DC voltage at a pin of the stepper motor, the DC voltage at a pin of the throttle motor, and combinations thereof to be near zero or less than 4 V. In an exemplary embodiment, checking the engine fuel injection system being at the not-running state may include measuring at least one of the DC voltage at a pin of the stepper motor, the DC voltage at a pin of the throttle motor, and combinations thereof, and comparing the at least one of the measured DC voltage at the pin of the stepper motor, the measured DC voltage at the pin of the throttle motor, and combinations thereof with the threshold voltage value.

In an exemplary embodiment, checking the engine fuel injection system to be at the not-running state may further include checking the AC voltage at output of the crank shaft sensor to be near zero or less than 2.5 V. In an exemplary embodiment, checking the engine fuel injection system to be at the not-running state may include measuring the AC voltage at output of the crank shaft sensor, and comparing the measured AC voltage at output of the crank shaft sensor with the threshold voltage value. In an exemplary embodiment, the threshold voltage may depend on the ECU type so it should be personalized for different ECU types.

Table 1 shows an exemplary summary of measured electrical current consumption ranges of an exemplary ECU of a petrol engine and status of the exemplary ECU detected based on the measured electrical current consumption. Furthermore, alarm lights related to each status of the exemplary ECU are available in TABLE 1. Moreover, exemplary information for a driver and a repairer is summarized in Table 1.

Figure 2:
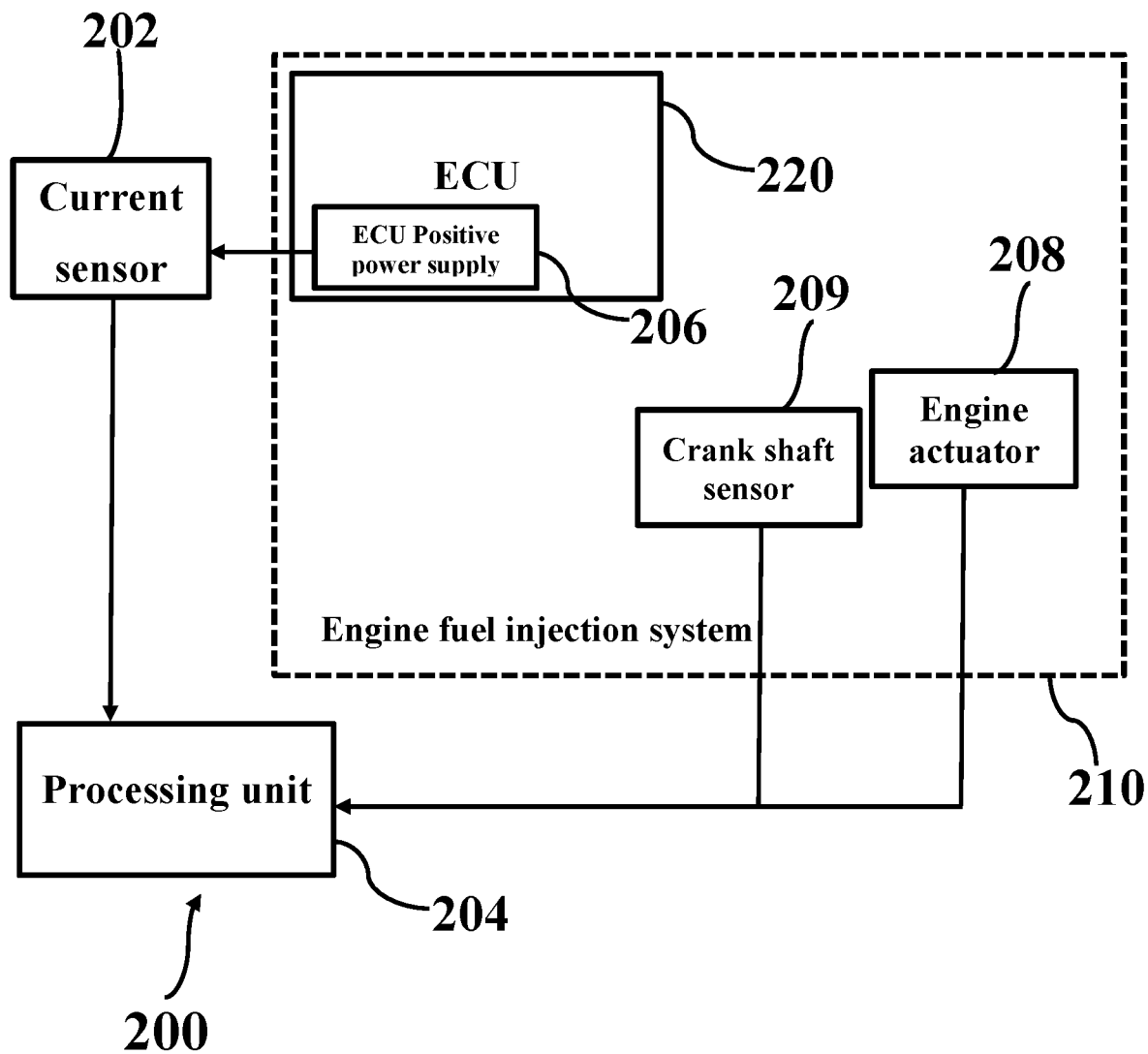
FIG. 2 shows a schematic of an exemplary system for fault diagnosis of an electronic control unit (ECU), consistent with one or more exemplary embodiments of the present disclosure.

FIG. 2 shows a schematic of an exemplary system for fault diagnosis of an electronic control unit (ECU), consistent with one or more exemplary embodiments of the present disclosure. In an exemplary embodiment, different steps of method 100 and/or method 150 may be implemented by utilizing an exemplary system 200 shown in FIG. 2. Exemplary system 200 may be embedded into exemplary engine fuel injection system 210, and may be configured to diagnose faults and failures of exemplary ECU 220 of engine fuel injection system 210.

In an exemplary embodiment, system 200 may include an exemplary electrical current sensor 202 and an exemplary processing unit 204. In an exemplary embodiment, electrical current sensor 202 may be connected to ECU 220 of engine fuel injection system 210. In an exemplary embodiment, electrical current sensor 202 may be configured to measure an electrical current consumption of ECU 220. In an exemplary embodiment, electrical current sensor 202 may be configured to measure an electrical current from at least one exemplary positive power supply pin 206 of ECU 220 as the electrical current consumption of ECU 220.

In an exemplary embodiment, processing unit 204 may be connected to electrical current sensor 202, at least one actuator 208 of engine fuel injection system 210, and crank shaft sensor 209. In an exemplary embodiment, processing unit 204 may be configured to receive an output voltage of ECU 220 from actuator 208 of engine fuel injection system 210, receive an output voltage of crank shaft sensor 209, receive the electrical current consumption of ECU 220 from electrical current sensor 202 that may be measured by electrical current sensor 202, and analyze the output voltage of ECU 220, the output voltage of crank shaft sensor 209, and the electrical current consumption of ECU 220. In an exemplary embodiment, processing unit 204 may be configured to analyze the output voltage of ECU 220, the output voltage of crank shaft sensor 209, and the electrical current consumption of ECU 220 that may include compare the output voltage of ECU 220 and the output voltage of crank shaft sensor 209 with a threshold voltage and detect a status of ECU 220 based on the electrical current consumption of ECU 220 measured by electrical current sensor 202.

In an exemplary embodiment, processing unit 204 may be further configured to send a warning signal associated with the detected status of ECU 220 by switching on an alarm light associated with the detected status of ECU 220. In an exemplary embodiment, processing unit 204 may include a microcontroller.

Figure 3:
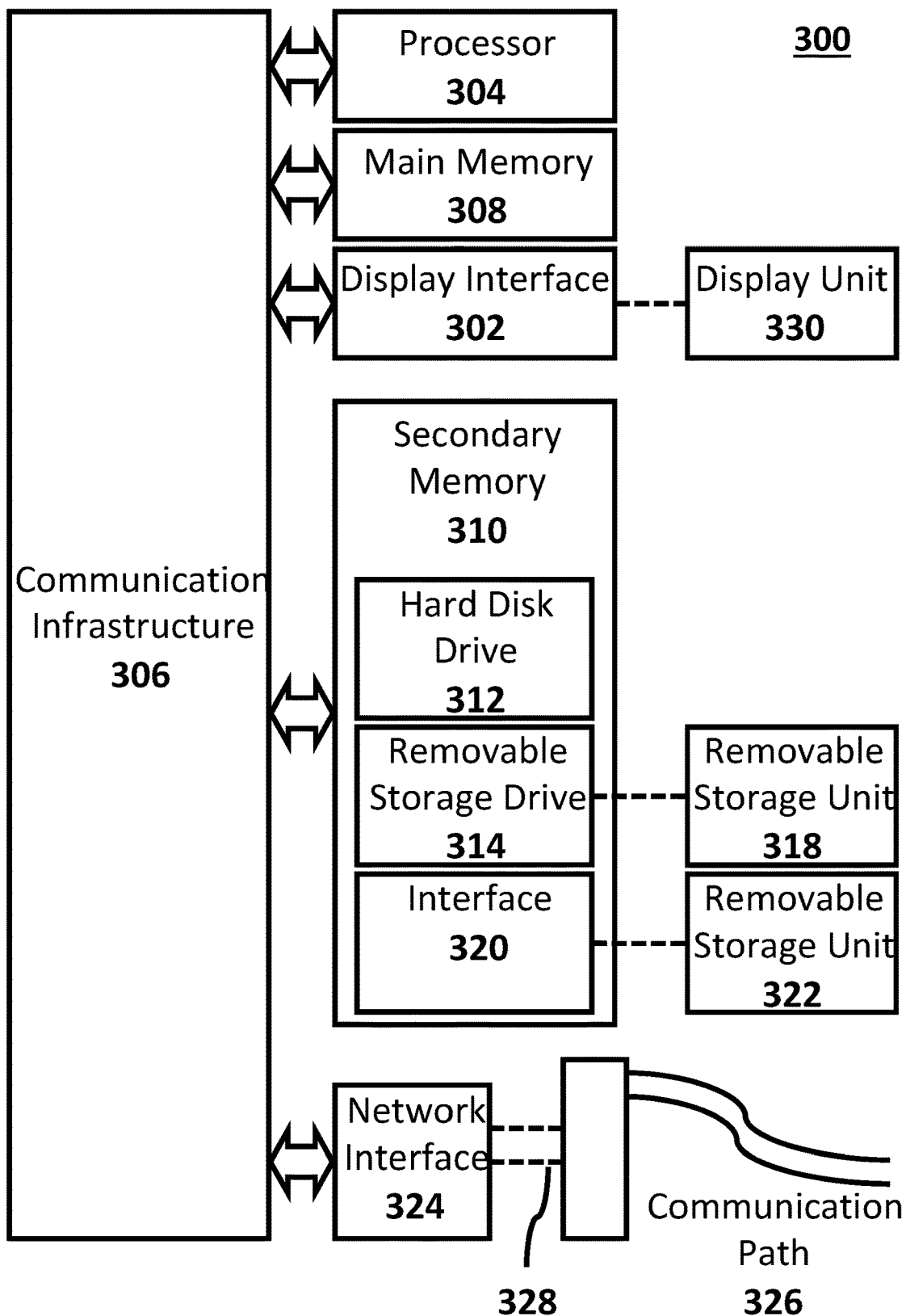
FIG. 3 shows a high-level functional block diagram of a computer system, consistent with one or more exemplary embodiments of the present disclosure.

FIG. 3 shows an example computer system 300 in which an embodiment of the present disclosure, or portions thereof, may be implemented as computer-readable code, consistent with exemplary embodiments of the present disclosure. For example, methods 100 and/or 150 may be implemented in computer system 300 using hardware, software, firmware, tangible computer readable media having instructions stored thereon, or a combination thereof and may be implemented in one or more computer systems or other processing systems. Hardware, software, or any combination of such may embody any of the modules and components in FIGS. 1A, 1B, and 2.

If programmable logic is used, such logic may execute on a commercially available processing platform or a special purpose device. One ordinary skill in the art may appreciate that an embodiment of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, a computing device having at least one processor device and a memory may be used to implement the above-described embodiments. A processor device may be a single processor, a plurality of processors, or combinations thereof. Processor devices may have one or more processor "cores."

An embodiment of the disclosure is described in terms of this example computer system 300. After reading this description, it will become apparent to a person skilled in the relevant art how to implement the disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 304 may be a special purpose or a general-purpose processor device. As will be appreciated by persons skilled in the relevant art, processor device 304 may also be a single processor in a multi-core/multiprocessor system, such system operating alone, or in a cluster of computing devices operating in a cluster or server farm. Processor device 304 may be connected to a communication infrastructure 306, for example, a bus, message queue, network, or multi-core message-passing scheme.

In an exemplary embodiment, computer system 300 may include a display interface 302, for example a video connector, to transfer data to a display unit 330, for example, a monitor. Computer system 300 may also include a main memory 308, for example, random access memory (RAM), and may also include a secondary memory 310. Secondary memory 310 may include, for example, a hard disk drive 312, and a removable storage drive 314. Removable storage drive 314 may include a floppy disk drive, a magnetic tape drive, an optical disk drive, a flash memory, or the like. Removable storage drive 314 may read from and/or write to a removable storage unit 318 in a well-known manner. Removable storage unit 318 may include a floppy disk, a magnetic tape, an optical disk, etc., which may be read by and written to by removable storage drive 314. As will be appreciated by persons skilled in the relevant art, removable storage unit 318 may include a computer usable storage medium having stored therein computer software and/or data.

In alternative implementations, secondary memory 310 may include other similar means for allowing computer programs or other instructions to be loaded into computer system 300. Such means may include, for example, a removable storage unit 322 and an interface 320. Examples of such means may include a program cartridge and cartridge interface (such as that found in video game devices), a removable memory chip (such as an EPROM, or PROM) and associated socket, and other removable storage units 322 and interfaces 320 which allow software and data to be transferred from removable storage unit 322 to computer system 300.

Computer system 300 may also include a communications interface 324. Communications interface 324 allows software and data to be transferred between computer system 300 and external devices. Communications interface 324 may include a modem, a network interface (such as an Ethernet card), a communications port, a PCMCIA slot and card, or the like. Software and data transferred via communications interface 324 may be in the form of signals, which may be electronic, electromagnetic, optical, or other signals capable of being received by communications interface 324. These signals may be provided to communications interface 324 via a communications path 326. Communications path 326 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 318, removable storage unit 322, and a hard disk installed in hard disk drive 312. Computer program medium and computer usable medium may also refer to memories, such as main memory 308 and secondary memory 310, which may be memory semiconductors (e.g. DRAMs, etc.).

Computer programs (also called computer control logic) are stored in main memory 308 and/or secondary memory 310. Computer programs may also be received via communications interface 324. Such computer programs, when executed, enable computer system 300 to implement different embodiments of the present disclosure as discussed herein. In particular, the computer programs, when executed, enable processor device 304 to implement the processes of the present disclosure, such as the operations (steps 106, 108 and 110) of method 100 illustrated by flowchart 100 of FIG. 1A and/or method 150 illustrated by flowchart 150 of FIG. 1B discussed above. Accordingly, such computer programs represent controllers of computer system 300. Where an exemplary embodiment of methods 100 and/or 150 is implemented using software, the software may be stored in a computer program product and loaded into computer system 300 using removable storage drive 314, interface 320, and hard disk drive 312, or communications interface 324.

Accordingly, in an exemplary implementation, an exemplary system for fault diagnosis of an exemplary ECU may be disclosed to implement one or more steps of exemplary methods 100 and/or 150 described hereinabove. The exemplary system may include a memory having processor-readable instructions stored therein, and one or more processors that may be configured to access the memory and execute the processor-readable instructions, which, when executed by the one or more processors configures the one or more processors to perform an exemplary process similar to methods 100 and/or 150. In an exemplary embodiment, the exemplary process may include receiving the measured electrical current consumption of the ECU from the electrical current sensor, detecting the status of the ECU based on the measured electrical current consumption, and sending the warning signal associated with the detected status of the ECU responsive to the engine fuel injection system being at the not-running state.

In an exemplary embodiment, detecting the status of the ECU based on the measured electrical current consumption may include detecting the normal status responsive to the measured electrical current consumption being in the normal electrical current range, detecting the first hardware defect in the ECU responsive to the measured electrical current consumption being in the first electrical current range, and detecting the second hardware defect in the ECU responsive to the measured electrical current consumption being in the second electrical current range. In an exemplary embodiment, sending the warning signal may include receiving the output voltage of the ECU from a sensor or an actuator of the respective engine fuel injection system to the ECU, comparing the output voltage with the threshold voltage, and switching on the alarm light associated with the detected status of the ECU responsive to the output voltage of the ECU being less than the threshold voltage.

Example 1: Detection of Hardware Defects in Different ECU Circuits

In this example, an exemplary method similar to methods 100 and/or 150 were applied utilizing an exemplary system similar to system 200 described hereinabove for different types of ECU of petrol engines. Table 2 shows the parameters of the ECUs and exemplary obtained current consumption ranges for different status of the exemplary ECUs that were detected based on exemplary measured electrical consumption ranges of exemplary ECUs.

Table 2. Different parameters and the measured current consumption ranges for different status of several ECUs.

| | | | | | | Current Consumption, mA | |
|---|---|---|---|---|---|---|---|
| ECU software | ECU TYPE | Application | Power supply pins (+) | Power supply pins (−) | Normal status | First hardware defect in 5 V parts | Second hardware defect in 12 V parts |
| BOSCH | 5.2 | Vehicle 2000 | 18 | 2 | | 350-1200 | 1200-3000 |
| SAGEM | S2000-35 | Vehicle | M1A4 | M1 H4 | 70-220 | 350-1200 | 1200-3000 |
| SAGEM | S2000-10 | Vehicle | M1A4 | M1 H4 | 70-220 | 350-1200 | 1200-3000 |
| SAGEM | S2000-11 | Vehicle | M1A4 | M1 H4 | 70-220 | 350-1200 | 1200-3000 |
| SAGEM | S2000-3F | Vehicle | M1A4 | M1 H4 | 70-220 | 350-1200 | 1200-3000 |
| SAGEM | S2000-3E | Vehicle | M1A4 | M1 H4 | 70-220 | 350-1200 | 1200-3000 |
| VALEO | PL4 | Vehicle | M1A4 | M1 H4 | 70-220 | 350-1200 | 1200-3000 |
| SAGEM | PL4 | Vehicle | M1A4 | M1 H4 | 70-220 | 350-1200 | 1200-3000 |
| BOSCH | ME7.4.5 | Vehicle | H2, F4 © | H4 © | 70-220 | 350-1200 | 1200-3000 |
| BOSCH | M7.9.7.1 | Vehicle | 12, 13, 63 | 3 | 70-220 | 350-1200 | 1200-3000 |
| BOSCH | ME7.4.4 | Vehicle | B4 (48 V MR) & G2 (32 V NR) | H4 | (32 V NR) | 350-1200 | 1200-3000 |
| BOSCH | ME7.4.4 | Vehicle | B4 (B) & G2 (C) | H4 © | 70-220 | 350-1200 | 1200-3000 |
| SIEMENS | FUEL | Vehicle | 29, 30 (B) | 28 (B) | 70-220 | 350-1200 | 1200-3000 |
| VALEO | J34 | Vehicle | L4, K3 | C4 | 70-220 | 350-1200 | 1200-3000 |

Embodiments of the present disclosure also may be directed to computer program products including software stored on any computer useable medium. Such software, when executed in one or more data processing device, causes a data processing device to operate as described herein. An embodiment of the present disclosure may employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nano-technologi cal storage device, etc.).

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

While the foregoing has described what may be considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various implementations. This is for purposes of streamlining the disclosure, and is not to be interpreted as reflecting an intention that the claimed implementations require more features than are expressly recited in each claim. Rather, as the following claims reflect, inventive subject matter lies in less than all features of a single disclosed implementation. Thus, the following claims are hereby incorporated into the Detailed Description, with each claim standing on its own as a separately claimed subject matter.

While various implementations have been described, the description is intended to be exemplary, rather than limiting and it will be apparent to those of ordinary skill in the art that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

What is claimed is:

1. A system for fault diagnosis of an electronic control unit (ECU), comprising:
   an electrical current sensor connected to the ECU of an engine fuel injection system, the electrical current sensor configured to measure an electrical current consumption of the ECU; and
   a processing unit connected to the electrical current sensor, the processing unit further connected to crank shaft sensor and at least one actuator of the engine fuel injection system, the processing unit configured to:
   receive an output voltage of the crank shaft sensor;
   receive an output voltage of the ECU from the at least one actuator of the engine fuel injection system;
   receive the electrical current consumption of the ECU from the electrical current sensor;
   analyze the output voltage of the crank shaft sensor, the output voltage of the ECU, and the electrical current consumption of the ECU, comprising:
      compare the output voltage of the crank shaft sensor and the output voltage of the ECU with a threshold voltage; and
      detect a status of the ECU based on the electrical current consumption of the ECU; and
   send a warning signal associated with the detected status of the ECU by switching on an alarm light associated with the detected status of the ECU.

2. The system of claim 1, wherein the processing unit comprises a microcontroller.

3. A system for fault diagnosis of an electronic control unit (ECU), the system comprising:
   a memory having processor-readable instructions stored therein; and
   one or more processors configured to access the memory and execute the processor-readable instructions, which, when executed by the one or more processors configures the one or more processors to perform a method, the method comprising:
   receiving a measured electrical current consumption of the ECU from an electrical current sensor connected to a positive power supply pin of the ECU;
   detecting a status of the ECU based on the measured electrical current consumption of the ECU, comprising:
      detecting a normal status responsive to the measured electrical current consumption of the ECU being in a normal electrical current range;
      detecting a first defect in the ECU responsive to the measured electrical current consumption of the ECU being in a first electrical current range; and
      detecting a second defect in the ECU responsive to the measured electrical current consumption of the ECU being in a second electrical current range; and
   sending a warning signal associated with the detected status of the ECU responsive to a respective engine fuel injection system to the ECU being at a not-running state, comprising:
      receiving an output voltage of the ECU from at least one of a stepper motor, a throttle motor, and combinations thereof;
      receiving an output voltage of a crank shaft sensor;
      comparing the output voltage of the ECU and the output voltage of the crank shaft sensor with a threshold voltage; and switching on an alarm light associated with the detected status of the ECU responsive to the output voltage of the ECU and the output voltage of the crank shaft sensor being less than the threshold voltage.

4. A method for fault diagnosis in an electronic control unit (ECU) of an engine fuel injection system, comprising:
keeping the ECU and the engine fuel injection system at a set of pre-defined conditions, comprising:
switching the ECU on by switching the engine fuel injection system on; and
keeping the engine fuel injection system at a not-running state;
measuring an electrical current consumption of the ECU by measuring an electrical current at a positive power supply pin of the ECU; and
detecting a status of the ECU based on the measured electrical current consumption, comprising:
detecting a normal status responsive to the measured electrical current consumption being in a normal electrical current range;
detecting a first defect in the ECU responsive to the measured electrical current consumption being in a first electrical current range; and
detecting a second defect in the ECU responsive to the measured electrical current consumption being in a second electrical current range.

5. The method of claim 4, wherein detecting the normal status comprises detecting the normal status responsive to the measured electrical current consumption being in a range between 70 mA and 260 mA.

6. The method of claim 5, wherein detecting the first defect in the ECU comprises detecting the first defect in the ECU responsive to the measured electrical current consumption being in a range between 350 mA and 1.2 A.

7. The method of claim 6, wherein detecting the first defect in the ECU comprises detecting at least one of a short circuit in a 5V-IC, a damaged 5V-IC, a burnt 5V-IC, a failure in a 5V component on the ECU board, and combinations thereof.

8. The method of claim 7, wherein detecting the first defect in the ECU comprises detecting a short circuit in at least one of an injector IC, a fan IC, a knock IC, a coil IC, a microcontroller IC, a regulator IC, an air pressure sensor, a temperature sensor, a water sensor, a part of injection system of the ECU, a 5V-part of control unit circuit, and combinations thereof.

9. The method of claim 7, wherein detecting the first defect in the ECU comprises detecting at least one of a burnt injector IC, a burnt fan IC, a burnt knock IC, a burnt coil IC, a burnt microcontroller IC, a burnt regulator IC, a burnt pressure sensor, a burnt temperature sensor, a burnt water sensor, and combinations thereof.

10. The method of claim 5, wherein detecting the second defect in the ECU comprises detecting the second defect in the ECU responsive to the measured electrical current consumption being in a range between 1.2 A and 3 A.

11. The method of claim 10, wherein detecting the second defect in the ECU comprises detecting at least one of a short circuit in a 12V-IC, a short circuit in a 12V part of the ECU, a damaged 12V-IC, a burnt 12V-IC, a failure in a 12V component on the ECU board, and combinations thereof.

12. The method of claim 11, wherein detecting the second defect in the ECU comprises detecting a failure in at least one of a regulator IC, a connection to a diagnostic IC, a stepper motor controller IC, and combinations thereof.

13. The method of claim 1, wherein keeping the engine fuel injection system at the not-running state comprises:
keeping an output voltage of a crank shaft sensor pin less than a threshold voltage; and
keeping an output voltage of the ECU less than the threshold voltage.

14. The method of claim 13, wherein keeping the output voltage of the ECU less than the threshold voltage comprises keeping the output voltage of the ECU at an actuator pin of at least one of a stepper motor, a throttle motor, and combinations thereof less than the threshold voltage.

15. The method of claim 4, wherein measuring the electrical current consumption of the ECU comprises:
connecting an electrical current sensor to the positive power supply pin of the ECU; and
measuring a value of the electrical current at the positive power supply pin of the ECU using the electrical current sensor.

16. The method of claim 4, further comprising sending a warning signal associated with the detected status of the ECU responsive to the engine fuel injection system being at the not-running state.

17. The method of claim 16, wherein sending the warning signal associated with the detected status of the ECU comprises:
measuring an output voltage of the ECU using an actuator of the engine fuel injection system;
measuring an output voltage of a crank shaft sensor of the engine fuel injection system;
comparing the measured output voltage of the ECU and the measured output voltage of the crank shaft sensor with a threshold voltage; and
switching on an alarm light associated with the detected status of the ECU responsive to the measured output voltage of the ECU and the measured output voltage of the crank shaft sensor being less than the threshold voltage.

18. The method of claim 17, wherein:
measuring the output voltage of the ECU comprises measuring a DC voltage at an actuator pin of at least one of a stepper motor, a throttle motor, and combinations thereof, and
measuring the output voltage of the crank shaft sensor comprises measuring an AC voltage at output of the crank shaft sensor.

* * * * *